United States Patent
Yudin et al.

(10) Patent No.: US 12,093,269 B2
(45) Date of Patent: Sep. 17, 2024

(54) METHOD AND SERVER FOR GENERATING AN ENRICHED QUERY

(71) Applicant: YANDEX EUROPE AG, Lucerne (CH)

(72) Inventors: Sergey Mikhailovich Yudin, Vologda (RU); Pavel Evgenevich Oreshin, Saransk (RU); Aleksei Dmitrievich Dumbai, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 0 days.

(21) Appl. No.: 18/082,141

(22) Filed: Dec. 15, 2022

(65) Prior Publication Data
US 2024/0202202 A1    Jun. 20, 2024

(51) Int. Cl.
*G06F 16/30* (2019.01)
*G06F 16/2457* (2019.01)
(Continued)

(52) U.S. Cl.
CPC .... *G06F 16/24578* (2019.01); *G06F 16/9532* (2019.01); *G06F 16/9538* (2019.01)

(58) Field of Classification Search
CPC .......... G06F 16/24578; G06F 16/9532; G06F 16/9538
See application file for complete search history.

(56) References Cited

U.S. PATENT DOCUMENTS 8,280,886 B2    10/2012    Labrou et al.
10,496,649 B1 *  12/2019    Das ................... G06F 16/24578
(Continued)

FOREIGN PATENT DOCUMENTS

CN    107193916 A    9/2017
RU    2633115 C2    10/2017
(Continued)

OTHER PUBLICATIONS

Cai et al., "Diversifying Query Auto-Completion", Published on Jun. 9, 2016, ACM Transactions on Information Systems, vol. 34, No. 4, Article 25, pp. 1-33, DOI: http://dx.doi.org/10.1145/2910579.
(Continued)

*Primary Examiner* — Khanh B Pham
(74) *Attorney, Agent, or Firm* — BCF LLP (57) ABSTRACT

Methods and servers for generating an enriched query are disclosed. The server acquires an indication of a user query, employs a first model to generate a first candidate string and a second candidate string that are respective candidates for the enriched query; employs a second model to determine that the first candidate string and the second candidate string are a pair of similar candidate strings, and causes display of only one of the pair of similar candidate strings as the enriched query on the electronic device. The second model is trained in a pair-wise configuration based on a training set. The training set includes a first and second training string and a label. The label is indicative of a similarity between the first training string with the second training string. The label is determined based on a comparison of training document(s) relevant to the first and second training string.

20 Claims, 6 Drawing Sheets

(51) Int. Cl.
*G06F 16/9532* (2019.01)
*G06F 16/9538* (2019.01)

(56) References Cited

U.S. PATENT DOCUMENTS

| | | | |
|---|---|---|---|
| 2010/0114928 A1 | 5/2010 | Bonchi et al. | |
| 2010/0114929 A1 | 5/2010 | Bonchi et al. | |
| 2010/0325133 A1* | 12/2010 | Rounthwaite | G06F 16/951 707/769 |
| 2011/0258148 A1 | 10/2011 | Gao et al. | |
| 2012/0131035 A1 | 5/2012 | Yang et al. | |
| 2012/0166450 A1 | 6/2012 | Choi et al. | |
| 2018/0060339 A1* | 3/2018 | Chen | G06F 16/24556 |
| 2018/0373719 A1 | 12/2018 | Valliani et al. | |
| 2018/0373721 A1 | 12/2018 | Liu | |
| 2019/0278870 A1* | 9/2019 | Novielli | G06N 20/00 |
| 2019/0370393 A1* | 12/2019 | Finch | G06F 16/3338 |

FOREIGN PATENT DOCUMENTS

| | | |
|---|---|---|
| RU | 2677379 C2 | 1/2019 |
| RU | 2744111 C2 | 3/2021 |

OTHER PUBLICATIONS

Song et al., "Post-ranking query suggestion by diversifying search results", Published on Jul. 24, 2011, DOI:10.1145/2009916. 2010025.

Ma et al., "Diversifying Query Suggestion Results", Published on Jul. 24, 2011, Proceedings of the Twenty-Fourth AAAI Conference on Artificial Intelligence (AAAI-10), pp. 1399-1404, http://www.dmoz.org.

Russian Search Report dated Dec. 5, 2023 issued in respect of the counterpart Russian Patent Application No. RU 2021127040.

* cited by examiner

METHOD AND SERVER FOR GENERATING AN ENRICHED QUERY

FIELD

The present technology relates to query enrichment in general and, specifically, to a method and server for generating an enriched query for a user of an electronic device.

BACKGROUND

The Internet provides access to a wide variety of resources, for example, video files, image files, audio files, or Web pages. Search engines are used to search these resources. For example, digital images that satisfy a user's informational need can be identified by a search engine in response to receiving a user query submitted by a user. User queries can be composed of one or more query terms. The search system selects and ranks search results based on their relevance to the user query and on their importance or quality relative to other search results and also provides top search results to the user.

Search systems can enrich the user experience by providing "suggestions" or "hints" to users to help users satisfy their informational needs. For example, a suggestion can be used as a supplement to a partially entered user query that can be used to refine a search or refine a search strategy. Some search systems provide suggestions in the form of a list as the user is typing a desired user query. In another example, hints can be displayed on a Search Engine Results Page (SERP), in response to a user query, so that the user can peruse the current search results and can select a next query if the user is not satisfied with the current search results. Provision of suggestions or hints that are desirable for the user is a difficult task.

US patent publication no. 2011/258148 discloses systems for predicting search intent from user browsing behavior data. For example, search patterns of a user browsing a web page and shortly thereafter performing a query may be extracted from user browsing behavior. Queries within the search patterns may be ranked based upon a search trigger likelihood that content of the web page motivated the user to perform the query.

SUMMARY

Developers of the present technology have appreciated certain technical drawbacks associated with the existing search systems. Conventional systems may provide enriched queries that are too similar to each other.

In a broad aspect of the present technology, developers of the present technology have devised methods and servers for causing display of a variety of enriched queries for a user of an electronic device. In one example, enriched queries can be "query extensions" or "query-completion suggestions". Such an enriched query is an extended query that includes the current query of the user and is displayed to the user (e.g., in a drop-down menu of the search bar) while the user is typing the query and prior to displaying the search results to the user. In another example, an enriched query may be a reformulated or a follow-up query to a current query submitted by the user. Such an enriched query is often displayed in a dedicated portion or a dedicated menu of a Search Engine Results Page (SERP) responsive to a current query submitted by the user. In some cases, such enriched queries may or may not include portions of the current query submitted by the user and are displayed to the user for allowing her to conveniently trigger a follow-up search, if the SERP does not contain satisfactory search results. In some embodiments, such enriched queries may be displayed as actionable thumbnails in a portion located at the top of the SERP. In other embodiments, such enriched queries may be displayed in a listed menu in a portion located at the bottom of the SERP.

Irrespective of a specific type of enriched query that is to be displayed to the user, displaying one or more enriched queries that are too similar to each other is undesirable. In one example, displaying similar enriched queries to the user inefficiently occupies real-estate on the screen of the user device. In another example, enriched queries that lead to similar search results are redundant for the purpose of satisfying the search needs of the user.

Developers of the present technology have devised methods for increasing the likelihood of satisfying the search needs of the user by displaying enriched queries that lead to a broader variety of search results. Without wishing to be bound to any specific theory, developers of the present technology have realized that filtering out candidates (for enriched queries) based on how similar respective search results are may allow the user to access a broader variety of search results via the enriched queries displayed thereto.

In a first broad aspect of the present technology, there is provided a method of generating an enriched query for a user of an electronic device. The method is executed by a server communicatively coupled to the electronic device. The server hosts a search engine. The method comprises acquiring, by the server, an indication of a user query from the electronic device, the user query associated with query data. The method comprises generating, by the server employing a first model, a first candidate string and a second candidate string based on the query data, the first candidate string and the second candidate string being respective candidates for the enriched query. The method comprises determining, by the server employing a second model, that the first candidate string and the second candidate string are a pair of similar candidate strings, the second model having been trained in a pair-wise configuration based on a training set. The training set includes a first training string representative of a first training query, a second training string representative of a second training query, and a label. The label is indicative of a similarity between the first training string with the second training string, the label has been determined based on a comparison of a first training document relevant to the first training query against a second training document relevant to the second training query. The method comprises causing, by the server, display of only one of the pair of similar candidate strings as the enriched query on the electronic device.

In some embodiments of the method, the label is indicative of that the first training string is similar to the second training string if the first training document matches the second training document.

In some embodiments of the method, the first training document is a first plurality of training documents and the second training document is a second plurality of training documents. The first plurality of training documents contains top N most relevant documents to the first training query. The second plurality of training document contains top M most relevant to the second training query, and the label is indicative of that the first training string is similar to the second training string if the first plurality of training documents and the second plurality of training documents share at least a pre-determined number of training documents.

In some embodiments of the method, the top N most relevant documents to the first training query and the top M most relevant documents to the second training query are determined by the search engine in an off-line mode prior to training of the second model.

In some embodiments of the method, the first model is a ranking model configured to generate a ranked list of candidate strings, the first candidate string and the second candidate string being ranked in the ranked list of candidate strings. The causes comprises causing, by the server, display of a higher ranked candidate string amongst the first candidate strings and the second candidate string as the enriched query on the electronic device.

In some embodiments of the method, the first model is a Deep Semantic Similarity Model (DSSM).

In some embodiments of the method, the second model is a DSSM.

In some embodiments of the method, the enriched query is an extended query that includes the query. The causes comprises causing, by the server, display of the extended query on the electronic device without displaying a SERP responsive to the query.

In some embodiments of the method, the enriched query is a reformulated query. The causes comprises causing, by the server, display of a SERP responsive to the query on the electronic device, the SERP including a portion with the reformulated query.

In some embodiments of the method, the enriched query is an extended query that includes the query. The causes comprises causing, by the server, display of a SERP responsive to the query on the electronic device, the SERP including a portion with the reformulated query.

In a second broad aspect of the present technology, there is provided a method of generating an enriched query for a user of an electronic device. The method is performed by a server communicatively coupled to the electronic device, the server hosting a search engine, the method executable by the server. The method comprises acquiring, by the server, query data associated with a query submitted by the user. The method comprises generating, by the server employing a model, a first candidate string and a second candidate string based on the query data and being respective candidates for the enriched query. The method comprises determining, in real-time by the server, a first plurality of documents based on the first candidate string that contains relevant documents to the first candidate string. The method comprises determining, in real-time by the server, a second plurality of documents based on the second candidate string that contains relevant documents to the second candidate string. The method comprises in response to the first plurality of documents and the second plurality of documents sharing at least a pre-determined number of documents, determining, by the server, that the first candidate string and the second candidate string are a pair of similar strings. The method comprises causing, by the server, display of only one of the pair of candidate strings as the enriched query on the electronic device.

In some embodiments of the method, the first model is a ranking model configured to generate a ranked list of candidate strings, the first candidate string and the second candidate string being ranked in the ranked list of candidate strings. The causing comprises causing, by the server, display of a higher ranked candidate string amongst the first candidate strings and the second candidate string as the enriched query on the electronic device.

In some embodiments of the method, the model is a DSSM.

In some embodiments of the method, the enriched query is an extended query including the query. The causing comprises causing, by the server, display of the extended query on the electronic device without displaying a SERP responsive to the query.

In some embodiments of the method, the enriched query is a reformulated query. The causing comprises causing, by the server display of a SERP responsive to the query on the electronic device, the SERP including a portion with the reformulated query.

In some embodiments of the method, the enriched query is an extended query that includes the query. The causing comprises causing, by the server, display of a SERP responsive to the query on the electronic device, the SERP including a portion with the reformulated query.

In a third broad aspect of the present technology, there is provided a server for generating an enriched query for a user of an electronic device, the server communicatively coupled to the electronic device, the server hosting a search engine. The server is configured to acquire an indication of a user query from the electronic device, the user query associated with query data. The server is configured to generate, by a first model, a first candidate string and a second candidate string based on the query data, the first candidate string and the second candidate string being respective candidates for the enriched query. The server is configured to determine, by a second model, that the first candidate string and the second candidate string are a pair of similar candidate strings, the second model having been trained in a pair-wise configuration based on a training set. The training set includes a first training string representative of a first training query, a second training string representative of a second training query, and a label. The label is indicative of a similarity between the first training string with the second training string, the label having been determined based on a comparison of a first training document relevant to the first training query against a second training document relevant to the second training query. The server is configured to cause display of only one of the pair of similar candidate strings as the enriched query on the electronic device.

In some embodiments of the server, the label is indicative of that the first training string is similar to the second training string if the first training document matches the second training document.

In some embodiments of the server, the first training document is a first plurality of training documents and the second training document is a second plurality of training documents. The first plurality of training documents contains top N most relevant documents to the first training query. The second plurality of training document contains top M most relevant to the second training query. The label is indicative of that the first training string is similar to the second training string if the first plurality of training documents and the second plurality of training documents share at least a pre-determined number of training documents.

In some embodiments of the server, the top N most relevant documents to the first training query and the top M most relevant documents to the second training query are determined by the search engine in an off-line mode prior to training of the second model.

In some embodiments of the server, the first model is a ranking model configured to generate a ranked list of candidate strings, the first candidate string and the second candidate string being ranked in the ranked list of candidate strings. The server configured to cause comprises the server configured to cause display of a higher ranked candidate string amongst the first candidate strings and the second candidate string as the enriched query on the electronic device.

In some embodiments of the server, the first model is a Deep Semantic Similarity Model (DSSM).

In some embodiments of the server, the second model is a DSSM.

In some embodiments of the server, the enriched query is an extended query that includes the query. The server configured to cause comprises the server configured to cause display of the extended query on the electronic device without displaying a SERP responsive to the query.

In some embodiments of the server, the enriched query is a reformulated query. The server configured to cause comprises the server configured to cause display of a SERP responsive to the query on the electronic device, the SERP including a portion with the reformulated query.

In some embodiments of the server, the enriched query is an extended query that includes the query. The server configured to cause comprises the server configured to cause display of a SERP responsive to the query on the electronic device, the SERP including a portion with the reformulated query.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
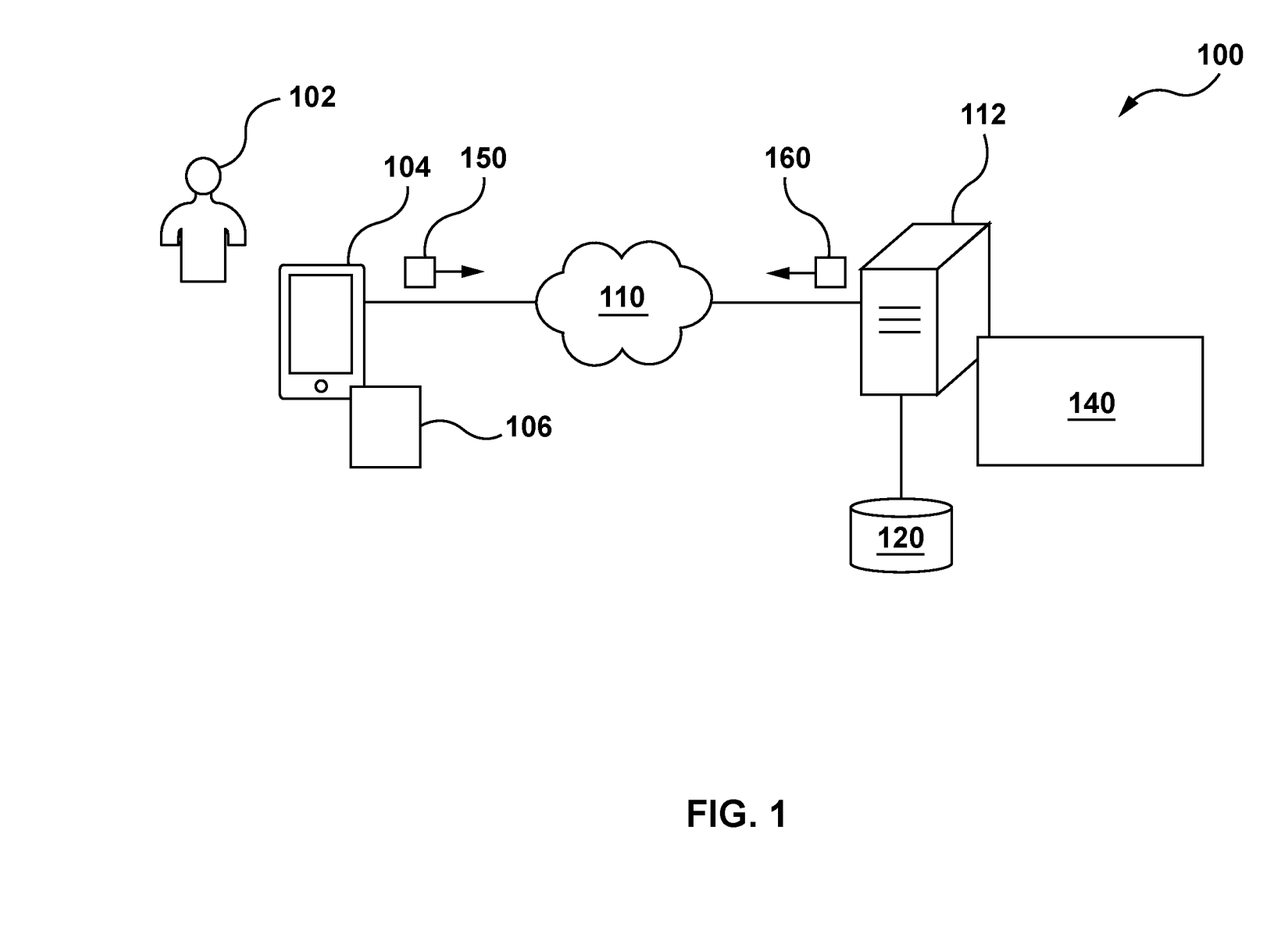
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide search results to a device 104 for display thereof to a user 102 in response to queries submitted by the user 102. The system 100 comprises the device 104 associated with the user 102. As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

The implementation of the device 104 is not particularly limited, but as an example, the device 104 may be implemented as a personal computer (desktops, laptops, netbooks, etc.), a wireless communication device (such as a smartphone, a cell phone, a tablet and the like), as well as network equipment (such as routers, switches, and gateways). The device 104 comprises hardware and/or software and/or firmware (or a combination thereof), as is known in the art, to execute a browser application 106. The purpose of the browser application 106 is to enable the user 102 to access one or more web resources. How the browser application 106 is implemented is not particularly limited. One example of the browser application 106 may be embodied as a Yandex™ browser.

Figure 2:
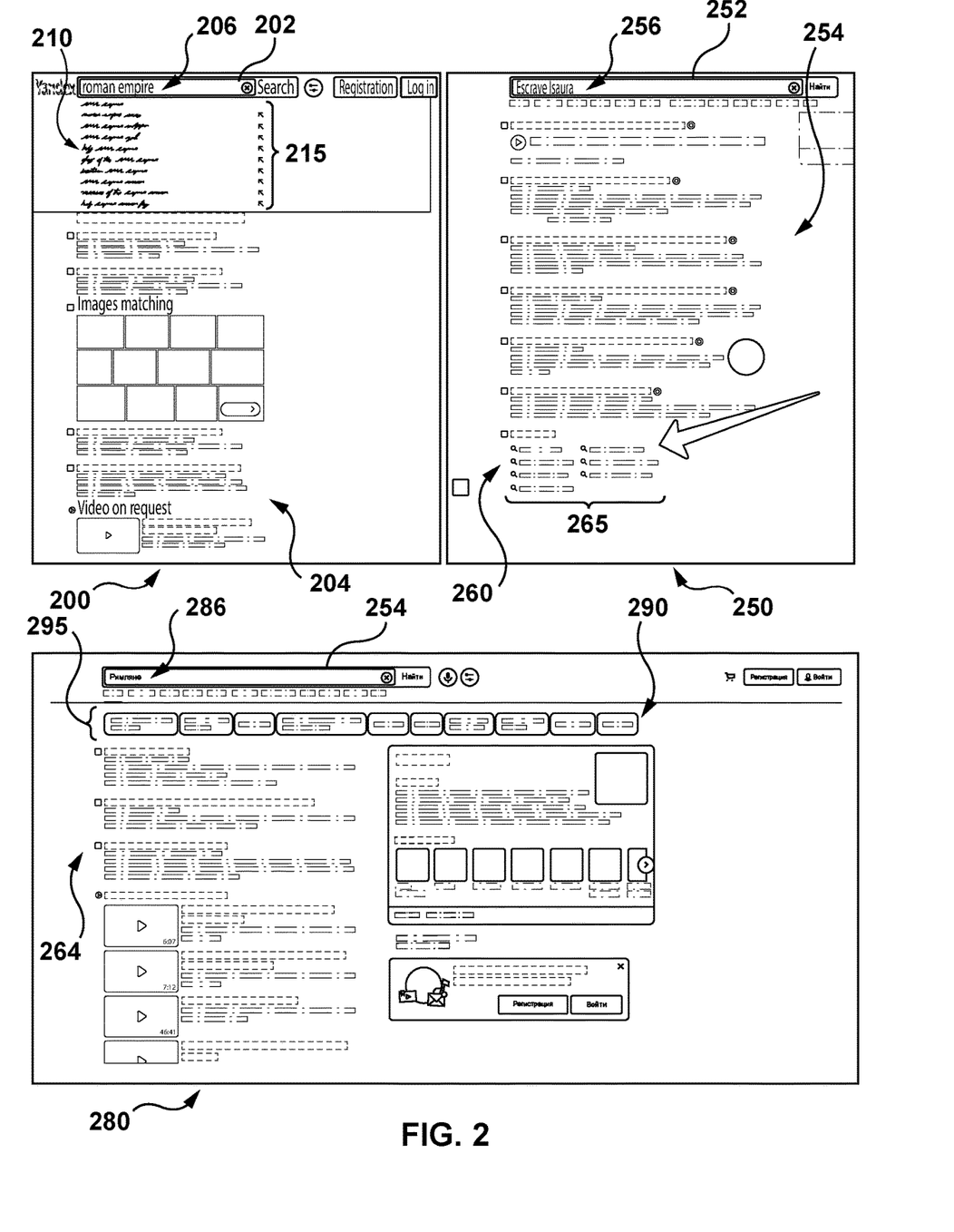
FIG. 2 depicts three different representations of a browser window of a browser application of a user device of the system of FIG. 1 according to some embodiments of the present technology.

With reference to FIG. 2, there is depicted three representations 200, 250, and 280 of a browser window (not numbered) of the browser application 106 as displayed by the device 104 to the user 102 in different embodiments of the present technology. Each representation of the browser window 200, 250, and 280 has a respective search bar. For example, the first representation 200 has a search bar 202, the second representation 250 has a search bar 252, and the third representation 280 has a search bar 282.

It should be noted that a given search bar enables the user 102 to type-in (or enter) and submit queries for searching for specific information. For example, the user 102 may submit a given query via a search bar which may be transmitted by the device 104 to a given search engine for searching for specific information associated with this query. As a result, the device 104 may then receive inter alia the specific information and may display it to the user 102 in a Search Engine Results Page (SERP) in the browser window.

It is contemplated that the search bar may be embodied as an "omnibar" of the browser application 106 itself without departing from the scope of the present technology. In other words, the functionalities of the search bar disclosed herein may be implemented via a given omnibar of the browser application 106.

In some embodiments of the present technology, as depicted in the representation 200, the search bar 202 can enable "query-completion functions" and, as such, enables transmitting a giving partial query, when the user 102 has not typed-in completely (or has not entered completely) a given desired user query into the search bar 202, for receiving in return query-completion suggestions.

As depicted in the representation 200, the browser window has a plurality of search results 204 provided to the user 102 in response to a previous query submitted by the user 102. Let it be assumed that the user 102 is about to submit a new query to the search engine. For that purpose, the user 102 begins entering a new partial query 206. While the user 102 is entering the new partial query 206, the user 102 is displayed with a query completion suggestion menu 210 having a plurality of completion suggestions 215.

It can be said that the plurality of completion suggestions 215 are "extended" versions of the new partial query 206 since a given completion suggestions includes the new partial query 206 and one or more additional terms which, in a sense, complete the new partial query 206. It is contemplated that a given one of the plurality of completion suggestions 215 may include one or more additional terms before, after, and/or in between the terms of the new partial query 206.

The user 102 may select a given one of the plurality of completion suggestions 215 as a new query for submission to the search engine. It is contemplated that the query completion suggestion menu 210 may be a transient menu that is displayed to the user 102 as the user 1021 is entering the new partial query 206 and can be updated, in real-time, with different completion suggestions as additional terms are entered by the user 102.

In other embodiments of the present technology, as depicted in the representation 250, the SERP displayed to the user 102 in the browser window may include a hint menu 260 at the bottom of the SERP. For example, in response to a query 256 submitted by the user 102, the user 102 may be displayed with a plurality of search results 254. If the user 102 is not satisfied with the plurality of search results 254, the user 102 can select one of a plurality of hints 265 displayed in the hint menu 260 for executing a new search with the selected hint serving as a new query.

It can be said that the plurality of hints 265 are reformulated queries that may or may not include one or more terms from the query 256. The purpose of a given one of the plurality of hints 265 is to allow the user 102 to conveniently launch a new search in an attempt to satisfy the search needs of the user 102, if the user 102 is not satisfied with one or more of the plurality of search results 254. The hints 265 displays a list of potential new queries at the bottom of a current SERP and which the user 102 may inspect for launching a new search after perusing through the plurality of search results 254.

In further embodiments of the present technology, as depicted in the representation 280, the SERP displayed to the user 102 in the browser window may include a plurality of actionable thumbnails 290 at the top of the SERP. For example, in response to a query 286 submitted by the user 102, the user 102 may be displayed with a plurality of search results 284. If the user 102 is not satisfied with one or more of the plurality of search results 284, the user 102 can select one of a plurality of follow-up queries 295 displayed in the plurality of actionable thumbnails 290 for executing a follow-up search for the selected follow-up query.

It can be said that the plurality of follow-up queries 285 are reformulated queries that may or may not include one or more terms from the query 286. The purpose of a given one of the plurality of follow-up queries 285 is to allow the user 102 to conveniently launch a follow-up search in an attempt to satisfy the search needs of the user 102 if the user 102 is not satisfied with one or more of the plurality of search results 284. The plurality of actionable thumbnails 290 is displayed at the top of a current SERP and which the user 102 may select for launching a follow-up search.

In the context of the present technology, the user 102 is displayed with one or more enriched queries for satisfying the search needs of the user 102. In some embodiments, a given enriched query may take the form of a "query completion suggestion", such as a given one of the plurality of completion suggestions 215. In other embodiments, a given enriched query may take the form of a "query hint", such as a given one of the plurality of hints 265. In further embodiments, a given enriched query may take the form of a "follow-up query", such as a given one of the plurality of follow-up queries 295. How the given enriched query is generated and displayed for the user 102 by the system 100 will be described in greater details herein further below.

Returning to the description of FIG. 1, the device 104 is communicatively coupled to the communication network 110 for accessing the server 112 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

The server 112 that can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

Generally speaking, the server 112 may be under control and/or management of a search engine provider (not depicted), such as, for example, an operator of the Yandex™ search engine. Broadly speaking, a search engine is a computer-implemented system that is designed to carry out web searches. They search the World Wide Web in a systematic way for particular information specified in a web search query. The search results are generally presented in a ranked manner, often referred to as SERPs. The information may be a mix of links to web pages, images, videos, infographics, articles, research papers, and other types of files. Some search engines also mine data available in databases or open directories. As known in the art, search engines can also maintain updated information about web documents by running a web crawling algorithm. Hence, as seen in FIG. 1, the server 112 hosts a search engine 140 associated with a given search bar and/or with the browser application 106. The server 112 may thus be configured to execute one or more searches responsive to desired user queries submitted via the given search bar and/or the browser application 106.

The server 112 is configured to acquire data from the electronic device 104 via a request data packet 150 and transmit data to the electronic device via a response data packet 160. For example, the request data packet 150 may comprise information indicative of a given query submitted by the user 102 and/or a given partial query currently entered by the user 102. In the same example, the response data packet 160 may comprise information indicative of one or more enriched queries for the user 102 and/or one or more search results in response to a submitted query and information for displaying the one or more enriched queries and/or the one or more search results in the browser application 106.

The server 112 is communicatively coupled to a database 120. The database 120 may be implemented in a single database. However, the database 120 may be split into several distributed storages. Generally speaking, the database 120 may receive data from the server 112 which was extracted or otherwise determined or generated by the server 112 during processing for temporary and/or permanent storage thereof and may provide stored data to the server 112 for use thereof.

As it will be described in further details herein below, the server 112 may be configured to make use of historical information collected from a large number of past user queries. As such, the database 120 is configured to store information associated with past user queries submitted to the server 112. Put another way, the database 120 may comprise one or more collections of data relating to past user queries that the user 102 and/or other users of the search engine have previously submitted to the server 112.

The server 112 may be configured to provide search results in response to a given desired user query submitted thereto. As such, the database 120 is configured to store information associated with at least some of possible search results that the server 112 may provide in response to desired user queries submitted thereto. Types of search results are not particularly limiting, however, suffice it to state that the server 112 may retrieve a set of search results from the database 120 for a given query submitted to the server 112 by the user 102 of the device 104 (or any other user of the search engine) and may provide the set of search results to the device 104 for display thereof to the user 102 (or the any other user of the search engine).

It is contemplated that the database 120 may host an inverted index associated with the search engine 140. Broadly speaking, an inverted index includes a large number of posting lists and represents a database index that stores a mapping from content, such as words or numbers, to its locations in a table, or in a document or a set of documents. The purpose of an inverted index is to allow faster retrieval of search results in response to a query. Inverted indexes are popular data structures that are used in document retrieval systems, especially for search engine systems.

The server 112 is configured to implement one or more machine learning algorithms for performing one or more functions of the search engine 140. Generally speaking, machine learning algorithms can learn from and make predictions on data. Machine learning algorithms are usually used to first build a model based on training inputs of data to then make data-driven predictions or decisions expressed as outputs, rather than following static computer-readable instructions. There are different types of machine learning algorithms having different structures or topologies as known in the art.

One group of machine learning algorithm includes Neural Networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than try to determine a complex statistical arrangements or mathematical algorithms for a given situation; the given NN tries to provide an "intuitive" answer based on a "feeling" for a situation. The given NN is thus a kind of a trained "black box", which can be used in a situation when what is in the "box" is unimportant; it is only important that the "box" provide reasonable answers to given inputs. NNs are commonly used in many such situations where it is only important to know an output based on a given input, but exactly how that output is derived is of lesser importance or is unimportant.

To summarize, the implementation of a given machine learning algorithm can be broadly categorized into two phases—a training phase and an in-use phase. First, the given machine learning algorithm is trained in the training phase. Then, once the given machine learning algorithm knows what data to expect as inputs and what data to provide as outputs, the given machine learning algorithm is actually run using in-use data in the in-use phase.

In the context of the present technology, the server 112 is configured to employ one or more machine learning algorithms for generating enriched queries for users of the search engine 140. In some embodiments of the present technology, the server 112 may be configured to generate an enriched query for the user 102 in accordance with the description of FIGS. 3 and 4. In other embodiments of the present technology, the server 112 may be configured to generate an enriched query for the user 102 in accordance with the description of FIG. 5.

Figure 3:
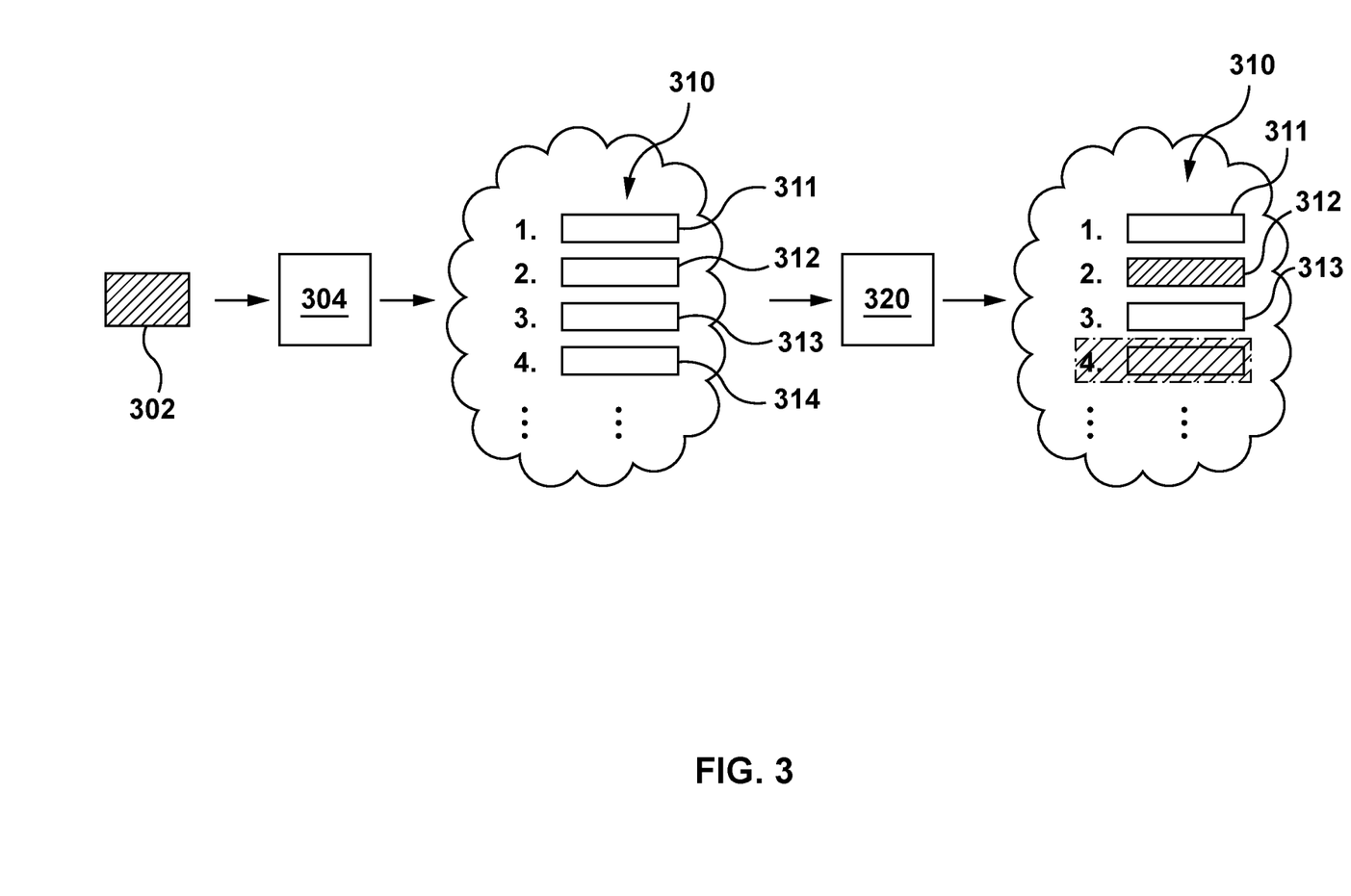
FIG. 3 is a representation of a process employed by a server of the system of FIG. 1 for generating a list of enriched queries according to some embodiments of the present technology.

With reference to FIG. 3, there is depicted a representation 300 of a process employed by the server 112 is configured to generate a list of enriched queries 390 for the user 102 in some embodiments of the present technology. In these embodiments, the server 112 is configured to execute a first model 304 and a second model 320. The first model 304 and the second model 320 can be implemented as respective machine learning algorithms. In at least one embodiment, the first model 304 and the second model 320 may be implemented as respective Deep Structured Semantic Models (DSSMs).

Broadly speaking, also referred to as "Deep Semantic Similarity Model", a DSSM is a Deep Neural Network (DNN) used for representing text strings (sentences, queries, predicates, entity mentions, etc.) in a continuous semantic space and modeling semantic similarity between two text strings (e.g., Sent2Vec). DSSMs have a broad variety of applications including information retrieval and web search ranking, ad selection/relevance, contextual entity searches, knowledge inference, image captioning, and machine translation.

The server 112 is configured to acquire query data 302 associated with a given query of the user 102. In some embodiments, the query data 302 may be indicative of a current query submitted by the user 102. In other embodiments, the query data 302 may be indicative of a partial query that the user 102 is currently entering in a search bar, for example.

In some embodiments of the present technology, the query data 302 may comprise the textual string representing the user query and/or the partial user query itself. It is contemplated that the query data may include one or more additional features associated with the user query and/or the partial user query. For example, the server 112 may be configured to access the database 120 and retrieve information stored in association with the user query and/or the partial user query. As such, the server 112 may be configured to retrieve historical data, for example, associated with the user query and/or the partial user query and use them as the one or more additional features in the query data 302.

The first model 304 executed by the server 112 is configured to use the query data 302 for generating a list of candidate strings 310. For example, the list of candidate strings 310 comprises candidate strings 311, 312, 313, and 314. A given candidate string in the list is a respective candidate for an enriched query to be provided to the user 102. In some embodiments of the present technology, the list of candidate strings 310 may be ranked amongst each other—that is, the list of candidate strings 310 may be a ranked list where a given candidate string is associated with a respective rank in that ranked list.

In at least some embodiments of the present technology, the server 112 may be configured to train and use the first model 304 similarly to what is described in a co-owned U.S. Pat. No. 10,846,340 entitled "Method and server for predicting a query-completion suggestion for a partial user-entered query", issued on Nov. 24, 2020, the contents of which is incorporated herein by reference in its entirety.

Once the server 112 generates the list of candidate strings 310 via the first model 304, the server 112 is configured to employ the second model 320. The purpose of the second model 320 is to identify which candidate strings from the list of candidate strings 310 are "similar" candidate strings. In other words, the server 112 may make use of the second model 320 for determining pairs of similar candidate strings from the list of candidate strings 310. The server 112 may use this information to exclude from the list of candidate strings 310, in a sense, "duplicates" (or "near duplicates" in a semantical sense of a search result that a given candidate string from the list of candidate strings 310 will generate) such that only one from a respective pair of similar candidate strings is provided as an enriched query to the user 102.

In the non-limiting example illustrated in FIG. 3, the server 112 may use the second model 320 for determining that the candidate strings 312 and 314 are a pair of similar strings. In this case, the server 112 may be configured to exclude one of the pair of similar strings from the list of enriched queries 390 provided to the user 102.

Developers of the present technology have realized that similarity between a pair of candidate strings may be determined based on how similar the search results that they would yield would be, if they were to be used as queries. In other words, in some embodiments, developers of the present technology have devised methods and servers where similarity of search results is used as a proxy for determining the similarity between the respective pair of candidate strings.

It can be said that the server 112 may employ the second model 320 for de-duplicating candidate strings in the list of candidate strings 310 such that enriched queries that are provided to the user 102 will yield diverse search results for the user 102. Such de-duplication of candidate strings for determining enriched queries may increase the likelihood that the search needs of the user 102 will be satisfied by at least one of the enriched queries due to the variety of respective search results.

Figure 4:
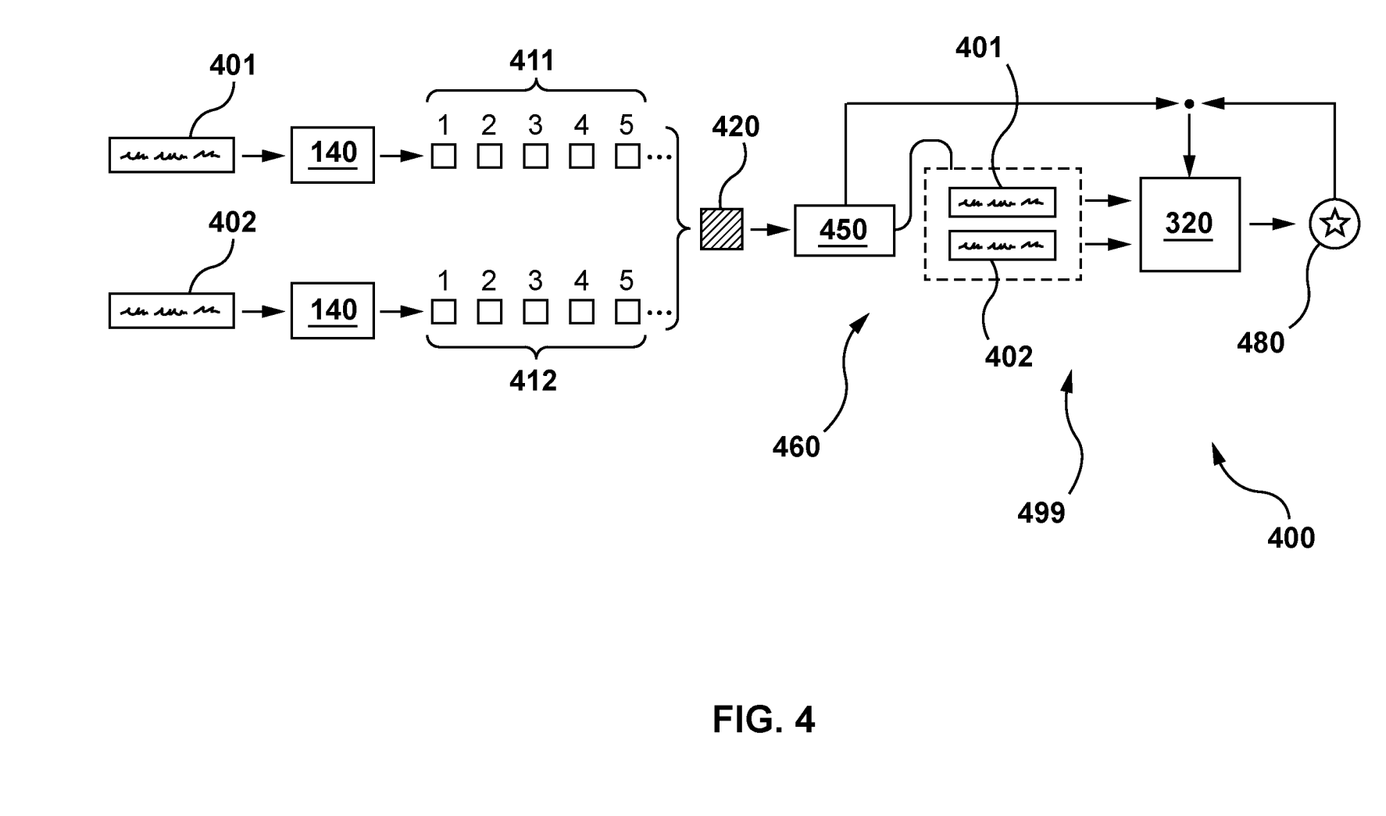
FIG. 4 is a representation of a single training iteration of a machine learning model employed in the process of FIG. 3 for determining whether a pair of candidate strings is a pair of similar candidate stings according to some embodiments of the present technology.

How the second model 320 is trained by the server 112 for determining pairs of similar candidate strings will now be described with reference to FIG. 4. There is depicted a single training iteration 499 of the second model 320 based on a training set 460. It should be noted that the server 112 is configured to train the second model 320 in an off-line mode. It can be said that the server 112 is configured to train the second model 320 prior to its use for determining which candidate strings from the list of candidate strings 310 are similar candidate strings. It should also be noted that although only a single training iteration 499 is depicted in FIG. 4, a large number of training iterations similar to the single training iteration 499 may be performed by the server 112 on the second model 320 during the training phase of the second model 320.

As mentioned above, the second model 320 is trained based on the training set 460 comprising a pair of training strings (not numbered), including a first training string 401 and a second training string 402, and a label 450. It can be said that the second model 320 is trained in a "pair-wise configuration" based on a pair of training strings and an associated label.

Prior to executing the single training iteration 499, the server 112 may be configured to generate and store the training set 460. To that end, the server 112 may be configured to retrieve the first training string 401 and the second training string 402 from the database 120. The server 112 is configured to use the search engine 140 in order to generate a first plurality of search results 411 for the first training string 401 (used as a query) and to generate a second plurality of search results 412 for the second training string 402 (used as a query).

In other embodiments, however, the database 120 may be storing a plurality of previous search results generated for the first training string 401 and a plurality of previous search results generated for the second training string 402. In these embodiments, the server 112 may be configured to, instead of generating the first plurality of search results 411 and the second plurality of search results 412 during the training set generation process, retrieve the plurality of previous search results for the respective ones of the first training string 401 and the second training string 402 from the database 120.

A given search result in the first plurality of search results 411 and in the second plurality of search results 412 may take different forms. It can be said that a given search result is a respective digital document that is relevant to a respective training string. For example, the digital document may be representative of a web page, a digital image, a news article, and the like.

The server 112 is configured to compare the first plurality of search results 411 against the second plurality of search results 412. In some embodiments, the server 112 may execute a comparison function 420 on the first plurality of search results 412 and the second plurality of search results 412 for generating the label 450 for the pair of the first training string 401 and the second training string 402.

In some embodiments, the comparison function 420 may be configured to determine whether top N search results in the first plurality of search results 411 and top N search results in the second plurality of search results 412 match. If the top N search results match, the server 112 may determine that the first training string 401 and the second training string 402 are a pair of similar training strings.

In other embodiments, the first plurality of search results 411 contain top N most relevant documents to the first training string 401, and the second plurality of search results contain top M most relevant to the second training string 402. In these embodiments, the comparison function 420 may determine that the first training string 401 is similar to the second training string 402 if the first plurality of search results 411 and the second plurality of search results 412 share at least a pre-determined number of search results and/or a pre-determined number of top search results.

In further embodiments, the server 112 can be configured to compare the most relevant search result from the first plurality of search results 411 against the most relevant search result from the second plurality of search results 412 for determining whether they match (same search result).

In one embodiment, let it be assumed that the top three search results in the first plurality of search results 411 match the top three search results in the second plurality of search results 412. In this embodiment, the server 112 may determine that the first training string 401 and the second training string 402 are a pair of similar strings. The server 112 is thus configured to generate the label 450 for the pair of training strings indicative of that they are a pair of similar training strings.

The server 112 may be configured to store the so-generated training set 460 in the database 120. The server 112 may be configured to store a large number of so-generated training sets based on respective pairs of training strings and by analyzing the respective search results to determine whether the respective pairs of training strings are pairs of similar training strings or otherwise not similar training strings. It should be noted that the number of search results that ought to match between the first plurality of search results 411 and the second plurality of search results 412 for determining that the pair of training strings is a pair of similar strings may depend inter alia specific implementations of the present technology. Irrespective of a specific comparison function used by the server 112 for generating the label 450, it can be said that the server 112 is configured to determine whether a pair of training strings is similar based on a match (or overlap) of most relevant search result(s) for each one of the pair of training strings.

Returning to the single training iteration 499, the server 112 is configured to input the first training string 401 and the second training string 402 into the second model 320.

In some embodiments, the second model 320 may be trained to predict a likelihood that the first training string 401 is similar to the second training string 402 (e.g., regression). In these embodiments, an output value 480 may be indicative of the likelihood that the first training string 401 is similar to the second training string 402. The server 112 may be configured to apply a penalty function (not depicted) for comparing the label 450 against the output value 480. In these embodiments, the label 450 may be a value of "0", for example, indicative of that the pair is not similar or "1", for example, indicative of that the pair is similar. In these embodiments, the output value may be a continuous value between "0" and "1". The server 112 may be configured to employ one or more machine learning techniques for, in a sense, "adjusting" the second model 320 for making a better prediction in the future. For example, the server 112 may be configured to employ a back-propagation technique based on a comparison between the label 450 and the output value 480.

In other embodiments, the second model 320 may be trained to predict whether or not the first training string 401 is similar to the second training string 402 (e.g., classification). The server 112 may be configured to apply a penalty function (not depicted) for comparing the label 450 against the output value 480. In these embodiments, an output value 480 may be indicative of a predicted class for the pair of training strings such as, for example, a "similar" class or a "not similar" class. In these embodiments, the label 450 may be indicative of a ground truth class for the pair. The server 112 may be configured to employ one or more machine learning techniques for, in a sense, "adjusting" the second model 320 for making a better prediction. For example, the server 112 may be configured to employ a back-propagation technique based on a comparison between the label 450 and the output value 480.

Once the server 112 so-trains the second model 320, the sever 112 may use the second model 320 in real-time for providing one or more enriched queries to the user 102. Returning to the description of FIG. 3, the server 112 may be configured to input respective pairs of candidate strings amongst the list of candidate strings 310 into the second model 320. The second model 320 is configured to determine for each inputted pair of candidate strings whether that inputted pair is a pair of similar strings.

Let it be assumed that the server 112 inputs the candidate string 312 and the candidate string 314 into the second model 320 and that the second model 320 determines that the candidate string 312 and the candidate string 314 is a pair of similar strings. In this case, the server 112 is configured to exclude one of the candidate string 312 and the candidate string 314 from the list of enriched queries 390.

In those embodiments where the list of candidate strings 310 is a ranked list of candidate strings, the server 112 may exclude the candidate string from the pair of similar strings that is ranked lower than the other one from the pair of similar strings. As such, in the non-limiting example illustrated in FIG. 3, the server 112 may exclude the candidate string 314 from the list of enriched queries 390 that may be provided to the user 102.

In summary, the second model 320 can be trained in an off-line mode based on a plurality of training sets. The training sets may be generated and stored a priori, and then may be used to train the second model 320 in the off-line mode. It can be said that the second model 320 can be trained prior to receive the query data 302, and may be employed by the server 112 in its in-use phase following the generation of the list of candidate strings 310. In other words, in these embodiments, the server 112 may not need to actually determine a plurality of search results for respective candidate strings from the list of candidate strings 310 when determine whether or not respective pairs of candidate strings are pairs of similar candidate strings.

Figure 5:
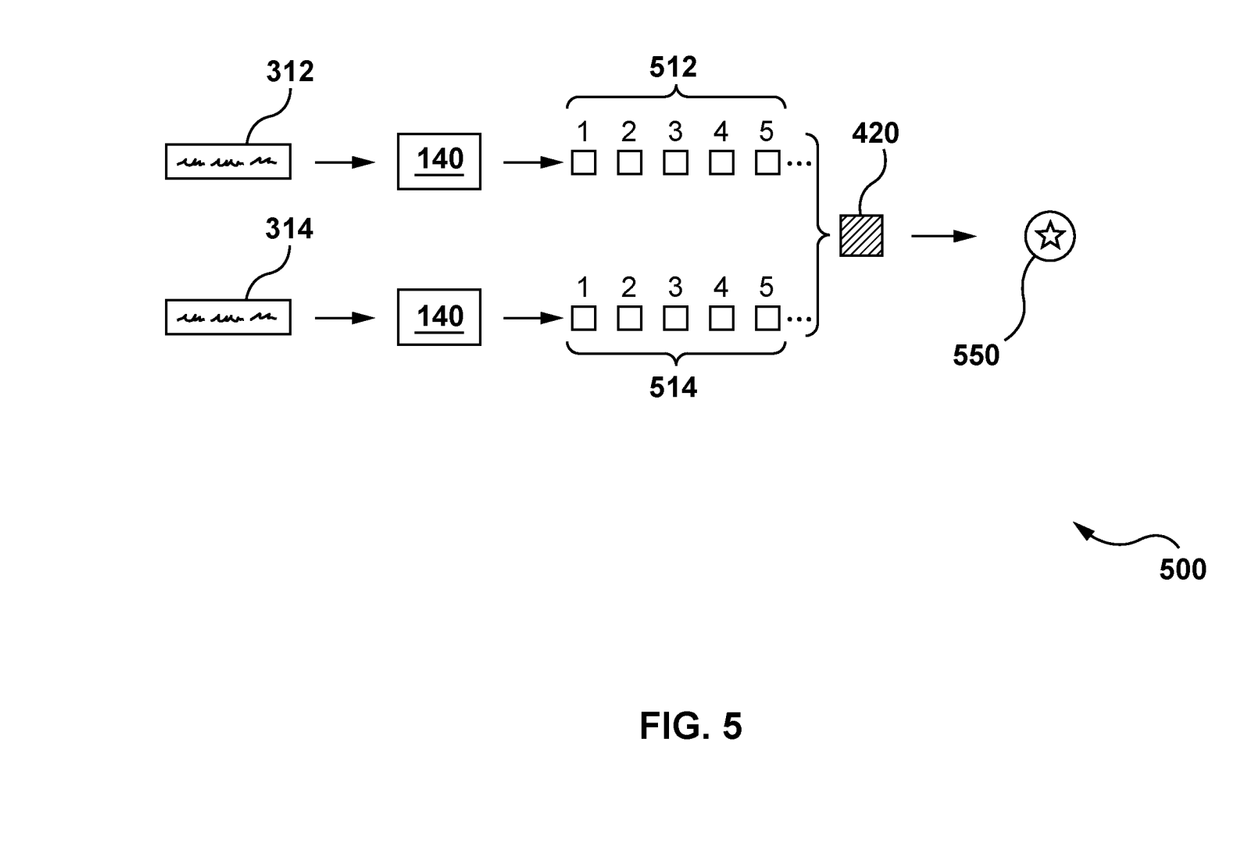
FIG. 5 is a representation of a process employed by a server of the system of FIG. 1 for generating a list of enriched queries according to other embodiments of the present technology.

With reference to FIG. 5, there is depicted a representation 500 of a process employed by the server 112 for determining whether a pair of candidate strings is a pair of similar candidate strings in accordance with other embodiments of the present technology.

In these embodiments, the server 112 may be configured to use the candidate string 312 for generating, in real-time, a plurality of search results 512 and use the candidate string 314 for generating, in real-time, a plurality of search results 514. The server 112 may then be configured to use the comparison function 420 for determining a parameter 550 indicative of whether the candidate strings 312 and 314 are a pair of similar candidate strings. In these embodiments, it can be said that, instead of using the second model 320 having been trained prior to the receipt of the query data 302, the server 112 may be configured to generate in real-time a plurality of search results for respective candidate strings from the list of candidate strings 310 (without displaying them to the user) for determining which candidate strings represent pairs of similar candidate strings. If the parameter 550 is indicative of that the candidate string 312 and the candidate string 314 are similar, the server 112 may exclude one of the candidate strings 312 and 314 from the list of enriched queries 390.

Figure 6:
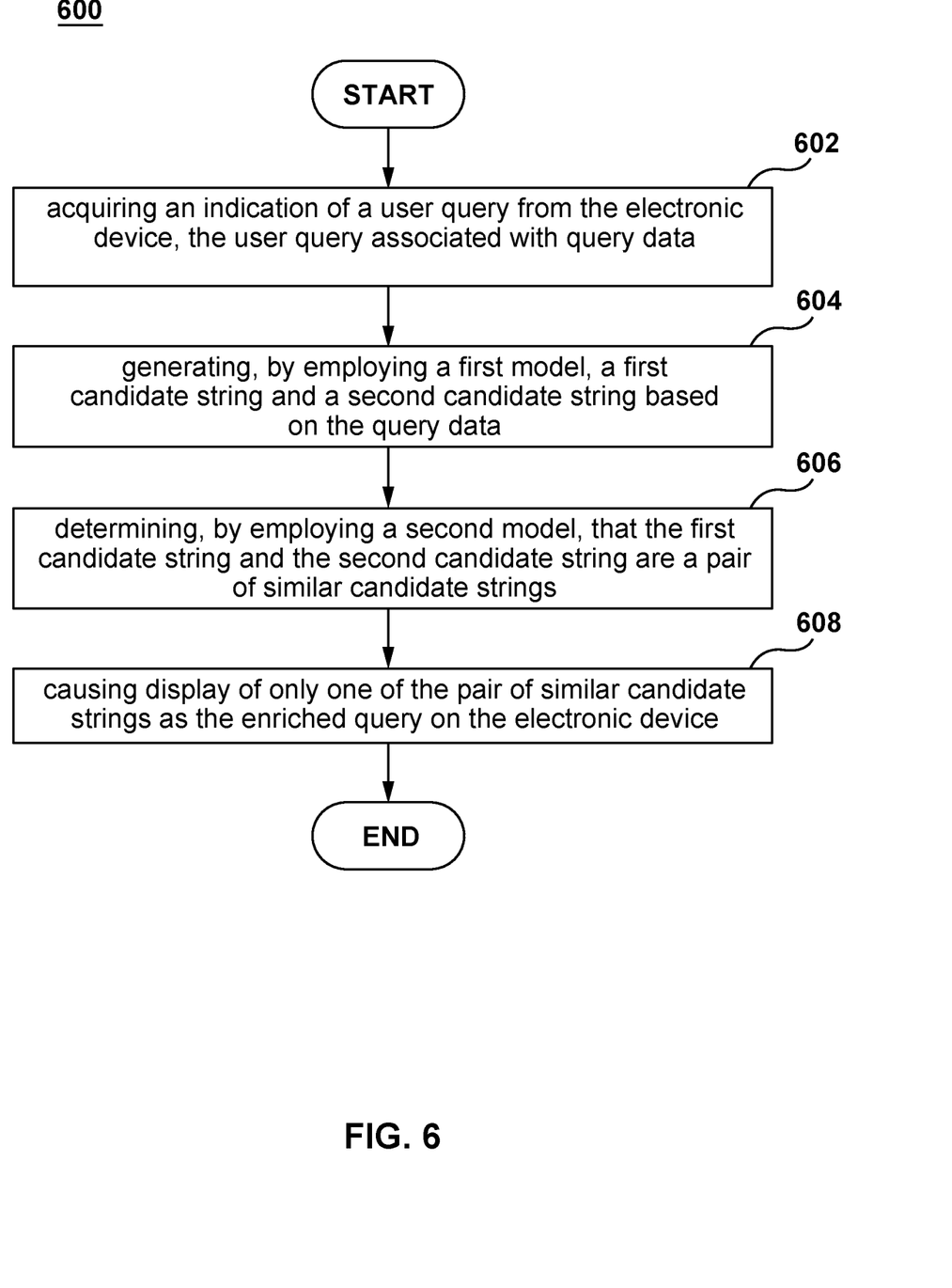
FIG. 6 is a schematic block diagram of a method executed by the server of FIG. 1 according to some embodiments of the present technology.

With reference to FIG. 6, there is depicted a scheme-block representation of a method 600 executed by the server 112 in at least some embodiments of the present technology. Various steps of the method 600 will now be discussed in detail.

Step 602: Acquiring an Indication of a User Query from the Electronic Device, the User Query Associated with Query Data The method 600 begins at step 602 with the server 112 configured to acquire an indication of a user query from the electronic device 104. The user query associated with query data. For example, the user query may be a query submitted by the user 102. In another example, the user query may be a partially-entered query by the user 102.

In some embodiments of the present technology, the query data may comprise the textual string representing the user query and/or the partial user query itself. It is contemplated that the query data may include one or more additional features associated with the user query and/or the partial user query. For example, the server 112 may be configured to access the database 120 and retrieve information stored in association with the user query and/or the partial user query.

As such, the server 112 may be configured to retrieve historical data, for example, associated with the user query and/or the partial user query and use them as the one or more additional features in the query data.

Step 604: Generating, by Employing a First Model, a First Candidate String and a Second Candidate String Based on the Query Data The method 600 continues to step 604 with the server 112 configured to generate, by employing a first model, a first candidate string and a second candidate string based on the query data. For example, the server 112 may employ the first model 304 for generating a plurality of candidate strings based on the query data. The first candidate string and the second candidate string are respective candidates for the enriched query.

In some embodiments, the first model 304 may be a ranking model configured to generate a plurality of candidate strings and rank them into a ranked list of candidate strings. It is contemplated that the first model 304 may be implemented as a given DSSM.

Step 606: Determining, by Employing a Second Model, that the First Candidate String and the Second Candidate String are a Pair of Similar Candidate Strings The method 600 continues to step 606 with the server 112 configured to determine by employing the second model 320, that the first candidate string and the second candidate string are a pair of similar candidate strings.

In some embodiments of the present technology, the second model 320 may be a DSSM trained based on the training set 460. The second model 320 may have been trained in a pair-wise configuration based on the training set 460 as described above with reference to FIG. 4.

It is contemplated that a training set for the second model 320 includes a first training string representative of a first training query, a second training string representative of a second training query, and a label. The label is indicative of a similarity between the first training string with the second training string, the label having been determined based on a comparison of a first training document relevant to the first training query against a second training document relevant to the second training query.

In some embodiments, the label may be indicative of that the first training string is similar to the second training string if the first training document matches the second training document.

In further embodiments, the first training document may be a first plurality of training documents and the second training document may be a second plurality of training documents. The first plurality of training documents contains top N most relevant documents to the first training query, and the second plurality of training document contains top M most relevant to the second training query. In these embodiments, the label may be indicative of that the first training string is similar to the second training string if the first plurality of training documents and the second plurality of training documents share at least a pre-determined number of training documents. The pre-determined number may be determined by the operator of the search engine 140.

In other embodiments, the top N most relevant documents to the first training query and the top M most relevant documents to the second training query can be determined by the search engine 140 in an off-line mode prior to training of the second model 320. In other embodiments, the most relevant documents for respective training queries may be retrieved from the database 120.

Step 608: Causing Display of Only One of the Pair of Similar Candidate Strings as the Enriched Query on the Electronic Device The method 600 continues to step 608 with the server 112 configured to cause display of only one of the pair of similar candidate strings as the enriched query on the electronic device 104. The server 112 may be configured to generate a data packet for transmission to the electronic device 104 over the communication network 110. The data packet may include at least information indicative of the one of the pair of similar candidate strings and instructions for displaying the one of the pair of similar candidate strings on the display of the electronic device 104.

It should be noted that more than one enriched queries may be displayed on the electronic device 104, however, only one of a given pair of similar candidate strings will be displayed as a respective enriched query.

In some embodiments, the server 112 may cause display of a higher ranked candidate string amongst the first candidate strings and the second candidate string in a ranked list of candidate strings generated by the first model 304 as the enriched query on the electronic device 104.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating an enriched query for a user of an electronic device, the method being executed by at least one server communicatively coupled to the electronic device, the at least one server hosting a search engine, the method comprising:

acquiring, by the at least one server, an indication of a user query from the electronic device, the user query associated with query data;

generating, by the at least one server employing a first machine learning algorithm, a first candidate string and a second candidate string based on the query data, the first candidate string and the second candidate string being respective candidates for the enriched query;

determining, by the at least one server, and by inputting the first candidate string and the second candidate string into a second machine learning algorithm, that the first candidate string and the second candidate string are a pair of similar candidate strings, wherein the second machine learning algorithm was trained to predict a likelihood that a first string is similar to a second string, and wherein the second machine learning algorithm was trained in a pair-wise configuration based on a training set, the training set including a first training string representative of a first training query, a second training string representative of a second training query, and a label, the label being indicative of a similarity between the first training string with the second training string, the label having been determined based on a comparison of a first training document relevant to the first training query against a second training document relevant to the second training query; and causing, by the at least one server, display of only one of the pair of similar candidate strings as the enriched query on the electronic device.

2. The method of claim 1, wherein the label is indicative that the first training string is similar to the second training string if the first training document matches the second training document.

3. The method of claim 1, wherein the first training document is a first plurality of training documents and the second training document is a second plurality of training documents,
the first plurality of training documents containing top N most relevant documents to the first training query,
the second plurality of training document containing top M most relevant to the second training query, and
the label being indicative that the first training string is similar to the second training string if the first plurality of training documents and the second plurality of training documents share at least a pre-determined number of training documents.

4. The method of claim 3, wherein the top N most relevant documents to the first training query and the top M most relevant documents to the second training query are determined by the search engine in an off-line mode prior to training of the second machine learning algorithm.

5. The method of claim 1, wherein the first model is a ranking model configured to generate a ranked list of candidate strings, the first candidate string and the second candidate string being ranked in the ranked list of candidate strings, the causing comprising:
causing, by the at least one server, display of a higher ranked candidate string amongst the first candidate string and the second candidate string as the enriched query on the electronic device.

6. The method of claim 1, wherein the first machine learning algorithm is a Deep Semantic Similarity Model (DSSM).

7. The method of claim 1, wherein the second machine learning algorithm is a DSSM.

8. The method of claim 1, wherein the enriched query is an extended query that includes the query, the causing comprising:
causing, by the at least one server, display of the extended query on the electronic device without displaying a search engine results page (SERP) responsive to the query.

9. The method of claim 1, wherein the enriched query is a reformulated query, the causing comprising:
causing, by the at least one server, display of a search engine results page (SERP) responsive to the query on the electronic device, the SERP including a portion with the reformulated query.

10. The method of claim 1, wherein the enriched query is an extended query that includes the query, the causing comprising:
causing, by the at least one server, display of a search engine results page (SERP) responsive to the query on the electronic device, the SERP including a portion with the extended query.

11. A method of generating an enriched query for a user of an electronic device, the method being performed by at least one server communicatively coupled to the electronic device, the at least one server hosting a search engine, the method executable by the at least one server, the method comprising:
acquiring, by the at least one server, query data associated with a query submitted by the user;
generating, by the at least one server employing a model, a first candidate string and a second candidate string based on the query data and being respective candidates for the enriched query;
determining, by the at least one server, a first plurality of search results based on the first candidate string;
determining, by the at least one server, a second plurality of search results based on the second candidate string;
in response to the first plurality of search results and the second plurality of search results sharing at least a pre-determined number of search results,
determining, by the at least one server, that the first candidate string and the second candidate string are a pair of similar strings; and
causing, by the at least one server, display of only one of the pair of candidate strings as the enriched query on the electronic device.

12. The method of claim 11, wherein the model is a ranking model configured to generate a ranked list of candidate strings, the first candidate string and the second candidate string being ranked in the ranked list of candidate strings, the causing comprising:
causing, by the at least one server, display of a higher ranked candidate string amongst the first candidate strings and the second candidate string as the enriched query on the electronic device.

13. The method of claim 11, wherein the model is a DSSM.

14. The method of claim 11, wherein the enriched query is an extended query including the query, the causing comprising:
causing, by the at least one server, display of the extended query on the electronic device without displaying a search engine results page (SERP) responsive to the query.

15. The method of claim 11, wherein the enriched query is a reformulated query, the causing comprising:
causing, by the at least one server, display of a search engine results page (SERP) responsive to the query on the electronic device, the SERP including a portion with the reformulated query.

16. The method of claim 11, wherein the enriched query is an extended query that includes the query, the causing comprising:
causing, by the at least one server, display of a search engine results page (SERP) responsive to the query on the electronic device, the SERP including a portion with the extended query.

17. A system for generating an enriched query for a user of an electronic device, the system communicatively coupled to the electronic device, the system hosting a search engine, the system comprising at least one processor and memory comprising executable instructions, which, when executed by the at least one processor, cause the system to:
acquire an indication of a user query from the electronic device, the user query associated with query data;
generate, by a first machine learning algorithm, a first candidate string and a second candidate string based on the query data, the first candidate string and the second candidate string being respective candidates for the enriched query;
determine, by inputting the first candidate string and the second candidate string into a second machine learning algorithm, that the first candidate string and the second candidate string are a pair of similar candidate strings, wherein the second machine learning algorithm was trained to predict a likelihood that a first string is similar to a second string, and wherein the second machine learning algorithm was trained in a pair-wise configuration based on a training set, the training set including a first training string representative of a first training query, a second training string representative of a second training query, and a label, the label being indicative of a similarity between the first training string with the second training string, the label having been determined based on a comparison of a first training document relevant to the first training query against a second training document relevant to the second training query; and cause display of only one of the pair of similar candidate strings as the enriched query on the electronic device.

18. The system of claim 17, wherein the label is indicative that the first training string is similar to the second training string if the first training document matches the second training document.

19. The system of claim 17, wherein the first training document is a first plurality of training documents and the second training document is a second plurality of training documents, the first plurality of training documents containing top N most relevant documents to the first training query, the second plurality of training document containing top M most relevant to the second training query, and the label being indicative that the first training string is similar to the second training string if the first plurality of training documents and the second plurality of training documents share at least a pre-determined number of training documents.

20. The system of claim 19, wherein the top N most relevant documents to the first training query and the top M most relevant documents to the second training query are determined by the search engine in an off-line mode prior to training of the second machine learning algorithm.

* * * * *